(12) United States Patent
Cho (10) Patent No.: US 11,665,789 B2
(45) Date of Patent: May 30, 2023

(54) INDUCTION RANGE OF UPPER AND LOWER HEATING TYPE AND DRIVING METHOD THEREOF

(71) Applicant: KOVAX CO., LTD., Busan (KR)

(72) Inventor: Bong Je Cho, Busan (KR)

( * ) Notice: Subject to any disclaimer, the term of this patent is extended or adjusted under 35 U.S.C. 154(b) by 689 days.

(21) Appl. No.: 16/659,618

(22) Filed: Oct. 22, 2019

(65) Prior Publication Data

US 2020/0128628 A1    Apr. 23, 2020

(30) Foreign Application Priority Data

Oct. 23, 2018 (KR) .......................... 10-2018-0126964
Mar. 28, 2019 (KR) .......................... 10-2019-0035675

(51) Int. Cl.
*H05B 6/06* (2006.01)
*H05B 6/12* (2006.01)
(Continued)

(52) U.S. Cl.
CPC ................ *H05B 6/065* (2013.01); *A23L 5/15* (2016.08); *A47J 36/32* (2013.01); *A47J 37/0611* (2013.01);
(Continued)

(58) Field of Classification Search
CPC ........ A23L 5/15; A23V 2002/00; A47J 36/32; A47J 37/0611; A47J 37/0629; A47J 37/0641; F24C 15/16; H05B 6/06; H05B 6/065; H05B 6/129; H05B 6/362; H05B 6/44
USPC ....... 219/620, 621, 622, 623, 624, 625, 626, 219/627, 660, 661, 662, 663, 664, 665, 219/666, 667, 670, 672, 673, 674, 675, 219/676, 600, 445.1
See application file for complete search history.

(56) References Cited

U.S. PATENT DOCUMENTS

2016/0331176 A1\*  11/2016  Frehn .................... H05B 6/12
2018/0263084 A1\*  9/2018   Yoshino ............. H05B 6/1236

FOREIGN PATENT DOCUMENTS

JP         2011019603 A  *  2/2011
JP         2017101899 A  *  6/2017
(Continued)

OTHER PUBLICATIONS

Translation of JP 2011-019603-A, Morozumi, Rice Cooker, Feb. 3, 2011, by ProQuest (Year: 2011).\*
(Continued)

*Primary Examiner* — Quang T Van
(74) *Attorney, Agent, or Firm* — Antonio Ha & U.S. Patent, LLC (57) ABSTRACT

The present disclosure relates to an induction range of an upper and lower heating type having an advantage of simply cooking a cooking object such as instant food packaged in a food packaging box in a short time, making food taste good by alternately heating upper and lower parts of the cooking object, preventing an electric control device from being burned out by applying an alternating heating type for excluding mutual induction interference between an upper heating unit and a lower heating unit for heating the cooking object, and preventing a burn occurring at the time of gripping the heated cooking object and promoting cleanliness by installing a separate cooling device used for cooling the cooking object or for deodorizing the cooking object.

7 Claims, 5 Drawing Sheets

(51) Int. Cl.
    *A23L 5/10*          (2016.01)
    *A47J 36/32*       (2006.01)
    *A47J 37/06*       (2006.01)
    *H05B 6/36*        (2006.01)
    *H05B 6/44*        (2006.01)
    *F24C 15/16*      (2006.01)

(52) U.S. Cl.
    CPC ........... *A47J 37/0641* (2013.01); *F24C 15/16* (2013.01); *H05B 6/129* (2013.01); *H05B 6/362* (2013.01); *H05B 6/44* (2013.01); *A23V 2002/00* (2013.01)

(56) References Cited

FOREIGN PATENT DOCUMENTS

| | | |
|---|---|---|
| KR | 10-2007-0066429 | 6/2007 |
| KR | 10-2011-0021440 | 3/2011 |
| KR | 10-1429655 | 8/2014 |
| KR | 10-2014-0131118 | 11/2014 |
| KR | 10-2018-0047980 | 5/2018 |

OTHER PUBLICATIONS

English Specification of 10-2007-0066429.
English Specification of 10-2011-0021440.
English Specification of 10-2014-0131118.
English Specification of 10-2018-0047980.
English Specification of 10-1429655.

\* cited by examiner

INDUCTION RANGE OF UPPER AND LOWER HEATING TYPE AND DRIVING METHOD THEREOF

CROSS-REFERENCE TO RELATED APPLICATION(S)

This non-provisional U.S. patent application claims priority under 35 U.S.C. § 119 to Korean Patent Application Nos. 10-2018-0126964, filed on Oct. 23, 2018, and 10-2019-0035675, filed on Mar. 28, 2019, in the Korean Intellectual Property Office, the disclosures of which are incorporated by reference herein in their entireties.

TECHNICAL FIELD

The disclosure disclosed herein relates to an induction range of an upper and lower heating type, and more particularly, to an induction range of an upper and lower heating type that is provided in a small retail store and the like such as a convenience store to simply cook a cooking object such as instant food packaged in a food packaging box in a short time and alternately heats upper and lower parts of the cooking object to make food taste good.

DISCUSSION OF RELATED ART

Unless otherwise indicated herein, the contents described in this section are not prior art to the claims of this application, and the contents included in this section should not be construed as prior art.

Generally, an induction range is an electronic cooking utensil of an electromagnetic induction heating type that generates heat by using power generated by an induction current to cook food, and has a surface of a heating unit in the form of a flat plate.

The induction range has an induction heating coil in the form of a flat plate that is mounted on an inside thereof, and the electromagnetic induction heating type (induction heating) used in the induction range applies a high-efficiency magnetic force line induction technology.

That is, a magnetic field is generated by applying an alternating current to an induction heating coil inside the induction range and an induction-only cooking container made of metal having magnetism is positioned at a center of the magnetic field, such that the cooking container is heated by an electrical resistance of the cooking container due to an eddy current.

The induction range is increasingly used since the induction range has no combustion flame, is safer than other electric cooking containers, is easily cleaned, can precisely control the cooking temperature, and does not require oxygen and therefore has cleanliness to be able to obtain heat even in a closed space.

There are various technologies related to such an induction range, and for example, Korean Laid-Open Patent Publication No. 10-2011-0021440 discloses "Induction Range Using High Frequency Induction Heating".

In the above Patent Document 1, the induction range is configured to have heat retaining property by mounting a heat and air cutoff stand on a top plate structure of the induction range in order to prevent the inside of the heated container from cooling down due to outside cold air or wind, and is configured to minimize a cross-sectional area of the heated container in contact with a bottom surface of the top plate by forming mounting holes on the bottom surface of the top plate.

Therefore, there is an advantage in that hot heat of the heated container is prevented from being transferred to the top plate of the induction range and any kind of containers can be used by installing a removable circular magnetic plate.

However, since the conventional general induction range including the above-described document heats only a bottom surface of a cooking object such as instant food packaged in a food packaging box, the induction range takes a long heating and cooking time as well as is somewhat lacking in flavoring food.

To this end, a method of heating upper and lower parts of a cooking object by simultaneously placing an induction heating coil up and down inside an induction range may be proposed. However, when the induction heating coils are placed adjacent to each other and power is applied thereto at the same time, the magnetic field is transmitted to the other coil due to mutual induction between the coils, so the electric control device may be burned out. As a result, the conventional induction range cannot be commercialized to date.

Therefore, there is a need for a device to make food taste good by simultaneously heating upper and lower parts of a cooking object by complement the above problems.

RELATED ART DOCUMENT

Patent Document (Patent Document 1) 1. Korean Patent Laid-Open Publication No. 10-2011-0021440 (Mar. 4, 2011)

(Patent Document 2) 2. Korean Patent Laid-Open Publication No. 10-2014-0131118 (Nov. 12, 2014)

(Patent Document 3) 3. Korean Patent No. 10-1429655 (Aug. 6, 2014)

(Patent Document 4) 4. Korean Patent Laid-Open Publication No. 10-2018-0047980 (May 10, 2018)

SUMMARY

An object of the present disclosure is to simply cook a cooking object such as instant food packaged in a food packaging box in a short time. An another object of the present disclosure is to provide an induction range of an upper and lower heating type to make food taste good by alternately heating upper and lower parts of a cooking object.

Still another object of the present disclosure is to provide an induction range of an upper and lower heating type capable of preventing an electric control device from being burned out by applying an alternating heating type for excluding mutual induction interference between an upper heating unit and a lower heating unit for heating a cooking object.

Another object of the present disclosure is to provide an induction range of an upper and lower heating type capable of preventing a burn occurring at the time of gripping a heated cooking object and promoting cleanliness by installing a separate cooling device used for cooling an outside a container containing the cooking object and for deodorizing the cooking object. A fan can be installed in consideration of air circulation.

To solve the above problems, the present disclosure has the following configuration.

There is provided an induction range of an upper and lower heating type, including: a body portion provided with an internal space having a cooking object housed therein; a lower heating unit provided on an a bottom surface inside the body portion to heat and cook a lower part of the cooking object; an upper heating unit provided on a top surface inside the body portion to heat and cook an upper part of the cooking object; and a control unit setting and controlling a temperature and time of the heating unit, wherein the upper heating unit and the lower heating unit stop after the lower heating unit heats the lower surface of the cooking object for a predetermined time in the entire heating time of the cooking object by the control unit, and the lower heating unit and the upper heating unit may alternately heat the upper and lower parts of the cooking object for a predetermined time by the method for allowing the upper heating unit to heat the top surface of the cooking object for a predetermined time and then stop.

The induction range of an upper and lower heating type according to an embodiment of the present disclosure includes a body portion provided with an internal space having a cooking object housed therein, a heating unit including a lower heating unit provided on an a bottom surface inside the body portion to heat and cook a lower part of the cooking object and an upper heating unit provided on a top surface inside the body portion to heat and cook an upper part of the cooking object, and a control unit setting and controlling a temperature and time of the heating unit.

The upper heating unit and the lower heating unit may alternately heat the upper part and the lower part of the cooking object by the control unit.

The body portion may be provided with a blower fan for cooling a handle portion of a container in which the heated cooking object is contained and deodorizing the cooking object.

The body portion may be provided with a tray for inserting or removing the cooking object between the upper heating unit and the lower heating unit.

An output of a magnetic field of the upper heating unit may be higher than that of the lower heating unit, so that the upper heating unit induces more magnetic field than the lower heating unit.

The upper heating unit may perform heating for a longer time than the lower heating unit.

A circuit is configured to connect an upper switch to one end of the upper heating unit and connect a lower switch to one end of the lower heating unit, check a driving timing of the upper heating unit in an upper induction range and a driving timing of the lower heating unit in a lower induction range to turn off a contact of the lower switch when a contact of the upper switch is turned on and turn off the contact of the upper switch when the contact of the lower switch is turned on, to thereby cut off the reverse current of the other induction range.

The upper switch and the lower switch may be constituted by a relay contact. A switching signal is input so that the relay contacts each may be turned on and then the upper heating unit and the lower heating unit perform heating at a time difference.

A switching signal may be cut off so that the upper heating unit and the lower heating unit are turned off in advance at a time difference before the contacts of the upper switch and the lower switch are each turned off.

The time difference may be several milliseconds or several tens of microseconds.

A unit constituting the switching signal may be IGBT.

The induction range of an upper and lower heating type has a method driven as follows.

There is provided a method for driving an induction range of an upper and lower heating type includes: pressing a start button on the induction range of an upper and lower heating type; opening a door of the induction range as a subsequent step (S10). However, it is not necessary to have the door, and therefore the opening of the door may be omitted.

The method includes checking a set time and temperature (S20).

Any one of the set time and temperature may be selected.

The method includes automatically detecting a container to be heated in the induction range (S30); not performing the subsequent step to detect the container again when the container is not detected; and closing the door of the induction range when the container is detected (S60), in which the corresponding step may also be omitted when there is no door.

The method includes operating a function of cutting off a reverse current by alternately inputting power to an upper heating unit and a lower heating unit during the set time (70); checking the set temperature (S80); repeating the operating a function of cutting off the reverse current by alternately inputting power to an upper heating unit and a lower heating unit during the set time which is the previous step when the set temperature is not reached; and sending a cooking complete message when the set temperature is reached (S90).

The method may further include measuring a size of the container after the step S30 (S40).

The method may further include automatically moving the upper heating unit to the size of the container after the step S40 (S50).

The method may further include opening the door of the induction range (S100); checking the container (S200); sending a container removal message when the container is inserted (S300); and closing the door when the container is removed (S400).

As described above, the induction range of the upper and lower heating type has the effect of simply cooking the cooking object such as the instant food packaged in the food packaging box in a short time.

In addition, there is an advantage of making food taste good by alternately heating the upper and lower parts of the cooking object.

There is an advantage of preventing the electric control device from being burned out by applying the alternating heating type for excluding the mutual induction interference between the upper heating unit and the lower heating unit for heating the cooking object.

There is an advantage of preventing the burn occurring at the time of gripping the heated cooking object and promoting the cleanliness by installing the separate cooling device used for cooling the cooking object or for deodorizing the cooking object.

DETAILED DESCRIPTION OF EXEMPLARY EMBODIMENTS

Various advantages and features of the present disclosure and methods accomplishing the same will become apparent from the following detailed description of embodiments with reference to the accompanying drawings. However, the present disclosure is not limited to exemplary embodiments disclosed below, but may be implemented in various different forms. These embodiments will be provided only in order to make the disclosure of the present disclosure complete and allow those skilled in the art to which the present disclosure pertains to completely recognize the scope of the present disclosure.

The present disclosure is defined by the scope of the present disclosure. Like reference numerals throughout the description denote like elements.

When it is determined that the detailed description of the known functions or configurations in describing the embodiments of the present disclosure may obscure the gist of the present disclosure, the detailed description thereof will be omitted. Further, the following terminologies are defined in consideration of the functions in the embodiments of the present disclosure and may be construed in different ways by users, an intention of operators, or conventions. Therefore, the definitions thereof should be construed based on the contents throughout the specification.

Figure 1:
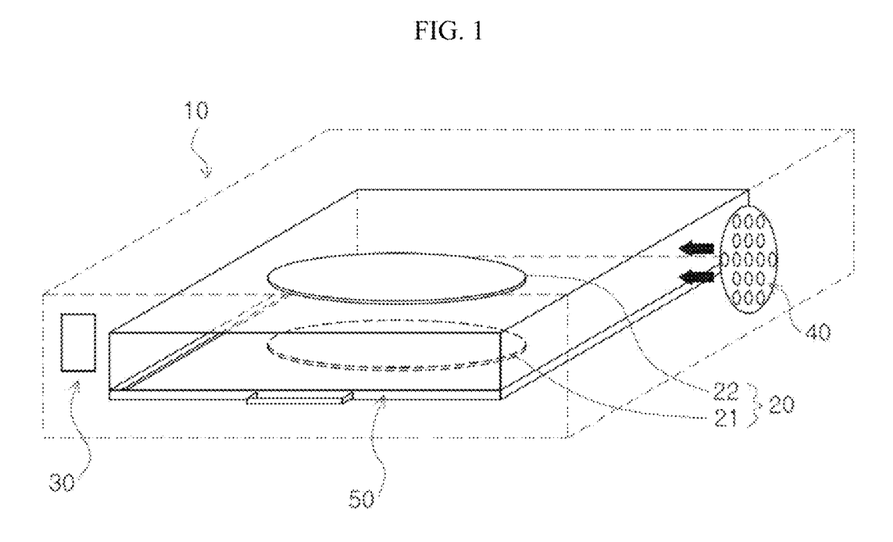
FIG. 1 is a perspective view of an induction range of an upper and lower heating type according to an embodiment of the present disclosure.

FIG. 1 is a perspective view of an induction range of an upper and lower heating type according to an embodiment of the present disclosure.

Figure 2:
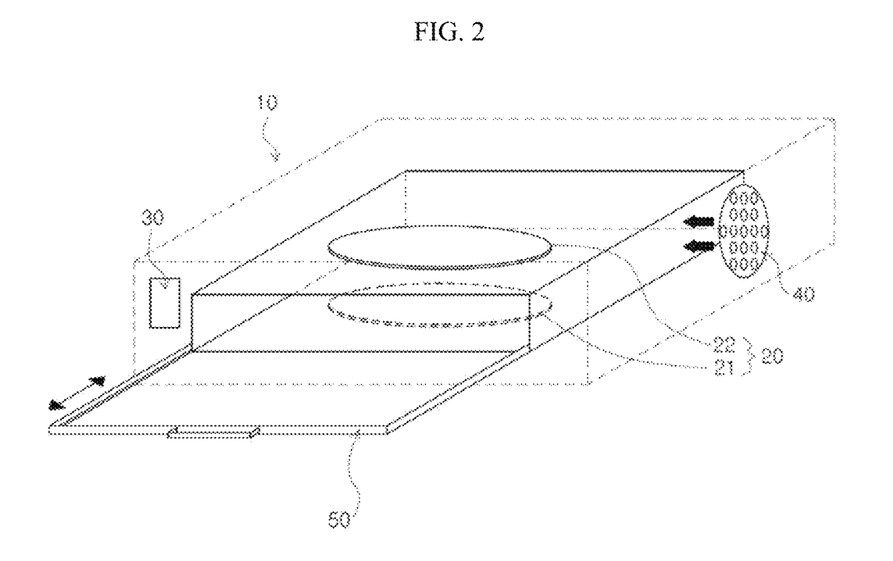
FIG. 2 is a diagram for describing a tray shown in FIG. 1.

FIG. 2 is a diagram for describing a tray shown in FIG. 1.

Figure 3:
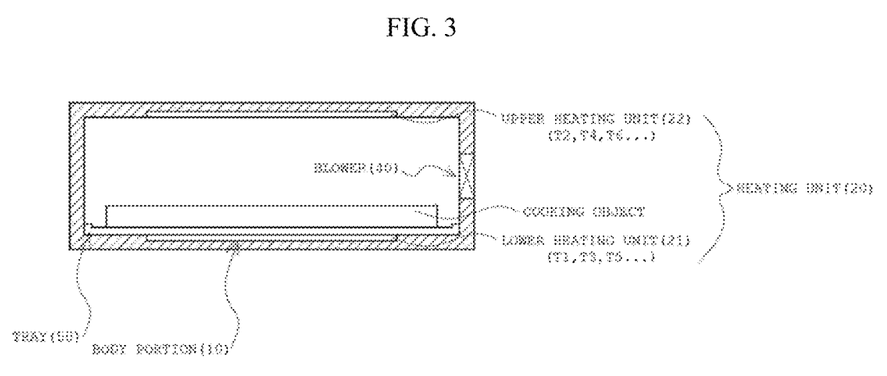
FIG. 3 is a diagram for describing a method for heating an induction range of an upper and lower heating type according to an embodiment of the present disclosure.

FIG. 3 is a diagram for describing a method for heating an induction range of an upper and lower heating type according to an embodiment of the present disclosure.

Referring to FIGS. 1 to 3, the induction range of the upper and lower heating type according to an embodiment of the present disclosure relates to an induction range of an upper and lower heating type that is provided in a small retail store and the like such as a convenience store to simply cook a cooking object such as instant food packaged in a food packaging box in a short time and alternately heats upper and lower parts of the cooking object to make food taste good, and is configured to include a body portion (10), a heating unit (20), and a control unit (30).

The body portion 10 has a box-shaped hexahedron shape having an opened front surface, and is provided with an internal space in which a cooking object (not shown) is housed. Thereby, the cooking object may be inserted into or removed from the internal space through the opened front surface.

The body portion 10 may be rotatably provided with a door (not shown) that opens or closes the opened front through a hinge coupling, thereby sealing the inside when the cooking object is heated to ensure heat retaining property and the like.

In addition, it may be more preferable that there is only upper and lower induction ranges corresponding to upper and lower heating units and there is no door.

In the case of simply heating food, it is preferable to insert or withdraw the food at any time by heating the food more conveniently within 5 minutes than opening and closing the door in a place where multiple people use.

In particular, when the food is put in a container and heated up, it may be more preferable that there is no door.

The body portion 10 is manufactured to be compact in order to be easily provided in a transport, a convenience store, and the like, and may be provided in various forms without being limited to a hexahedron shape.

The heating unit 20 is configured to include a lower heating unit 21 that is installed on a bottom surface inside the body portion 10 to heat a lower part of the cooking object for cooking and an upper heating unit 22 that is installed on a top surface inside the body portion 10 to heat an upper part of the cooking object for cooking.

The lower heating unit 21 is provided as a plate-like body as shown in FIGS. 1 and 2, and has a coil (not shown) for induction heating mounted therein.

The lower heating unit 21 is provided so that the coil for induction heating is embedded inside a ceramic glass, and is configured to include a switching unit that supplies driving power to the coil, and an induction driving unit that outputs a turn-on signal or a turn-off signal for turning on or off the switching unit.

In addition, the lower heating unit 21 is configured to include a resonant voltage detecting unit for detecting a resonant voltage of the coil and a resonant current detector for detecting a resonant current flowing in accordance with an operation of the coil.

The above-described configuration is a commonly known technology in the field of the induction range to which the present disclosure belongs, and therefore a detailed description thereof will be omitted.

The upper heating unit 22 is provided as a plate-like body having the configuration of the lower heating unit 21 as described above, and is provided on a top side surface inside the body portion 10 with being spaced apart from the lower heating unit 21 to heat the upper part of the cooking object housed in the body portion 10.

Accordingly, the upper heating unit 22 and the lower heating unit 21 of the present disclosure are provided in the body portion 10 so as to have the cooking object positioned therebetween, thereby alternately heating the upper and lower parts of the cooking object by the control unit 30 to be described later as shown in FIG. 3.

More specifically, during the entire heating time of the cooking object, the lower heating unit 21 and the upper heating unit 22 repeats alternating heating the lower and upper parts of the cooking object for a predetermined time (T1, T2, T3, T4, T5, T6, . . . ) in such a manner that the lower heating unit 21 heats the bottom surface of the cooking object for the predetermined time T1 and then stops, and the upper heating unit 22 then heats the top surface of the cooking object for the predetermined time T2 and then stops.

As described above, the reason that the lower heating unit 21 and the upper heating unit 22 perform the alternating heating is to exclude mutual induction interference between the upper heating unit 22 and the lower heating unit 21 which causes a problem in that when the upper heating unit 22 and the lower heating unit 21 are disposed adjacent to each other, the mutual induction occurs between the coils at the time of the application of power to apply a magnetic field to the other coil, to thereby burn out an electric control device. Therefore, the upper heating unit 22 and the lower heating unit 21 are disposed adjacent to the cooking object and can efficiently heat the upper and lower parts of the cooking object, such that the upper heating unit 22 and the lower heating unit 21 may cook food to make the food taste good with a simple structure without special structural changes.

Meanwhile, one of the lower heating unit 22 and the upper heating unit 21 of the present disclosure may be selected as a heater, that is, the selected one of the lower heating unit 22 or the upper heating unit 21 uses an induction heating coil as described above and the other thereof includes a heating coil or the like using far infrared rays or the like, and thus can perform heating even when using not only box-type cooking objects but also general cooking tools using a pot, glass, and ceramics.

The control unit 30 is provided in the body portion 10 to set and control the temperature and time of the heating unit 20.

The control unit 30 may include an operation unit for setting the power supply on/off, temperature, and time of the upper heating unit 22 and the lower heating unit 21, a temperature display unit for displaying temperature, a buzzer for guiding an operating state, a sensor for detecting and controlling the alternating, temperature, and time of the upper heating unit 22 and the lower heating unit 21, and the like. However, various functions may be added without being limited thereto.

On the other hand, the body portion 10 of the induction range of the upper and lower heating type of the present disclosure described above can be provided with a blower fan 40 for cooling the outside of the container of the heated cooking object or deodorizing the cooking object as shown in FIGS. 1 and 2.

The blower fan 40 performs a cooling function which blows the heated container to cool the external temperature of the packaging container of the cooking object to prevent a burn that may occur at the time of gripping the heated cooking object.

In addition, when the blower fan 40 is opposite to the rotation for cooling, the blower fan 40 may discharge air inside the body portion 10 to the outside to perform a deodorizing function to remove odors, thereby making it possible to promote cleanliness.

The blower fan 40 is a known technology, and therefore the detailed descriptions of the configuration and operation thereof will be omitted.

As shown in FIGS. 1 and 2, the body portion 10 of the induction range of the upper and lower heating type of the present disclosure described above can be provided with a tray 50 for inserting or removing the cooking object between the upper heating unit 22 and the lower heating unit 21.

As shown in the drawings, the tray 50 is provided with a plate-like body for seating the cooking object to move back and forth through a sliding movement inside the body portion 10.

As shown in FIG. 2, the tray 50 can seat the cooking object in the state of drawing out to the outside of the body portion 10, so that a center side of the cooking object is easily coincide with that of the lower heating unit 21 and the upper heating unit 22. As a result, the cooking object is positioned in the heating range between the upper heating unit 22 and the lower heating unit 21 without being biased in any one of the side directions to be evenly heated on the whole.

As shown in the drawing, the front surface of the tray 50 may be provided with a handle for a user to grip the tray 50, such that there is an advantage in inserting or removing the cooking object into or from the body portion 10.

The present disclosure as described above describes and illustrates that the tray 50 is inserted or removed in a manual manner that the user grips the tray 50, but one side surface of the tray is provided with a rack gear and the tray is configured to include a motor to which a pinion gear of a tip part of the rack gear is attached and can be automatically operated by a configuration in which a button electrically connected to operate the motor is provided on the body portion 10 and the configuration can be easily combined by a design change, and therefore the configuration and description thereof will be omitted.

This will be described below with reference to FIGS. 4 and 5.

As described above, the induction range of the upper and lower heating type is to simply cook the cooking object such as instant food packaged in the food packaging box in a short time and alternately heat the upper and lower parts of the cooking object to make food taste good.

In addition, by applying the alternating heating type for excluding the mutual induction interference between the upper heating unit and the lower heating unit for heating the cooking object, the electric control device is prevented from being burned out.

A separate cooling device used for cooling the cooking object or deodorizing the cooking object has an advantage of preventing a burn occurring at the time of gripping the heated cooking object and promoting cleanliness.

The induction range controller of the upper and lower heating type is configured to constantly fix the temperature of the food to be cooked, and alternately input power to the upper heating unit and the lower heating unit to apply heat.

Therefore, when the induction range controller of the upper and lower heating type further heats the upper part of the cooking object, the induction range controller of the upper and lower heating type is a type that alternately heats the upper and lower parts of the cooking object and increase the output of the magnetic field of the upper heating unit to further heat foods.

The induction range is positioned on the upper and lower parts of the cooking object, and there is provided the induction range in which the container is inserted between the upper induction range and the lower induction range for cooking and which performs the upper and lower alternating heating at a time difference.

When the magnetic field from the induction coil of the lower induction range flows into the induction coil of the upper induction range while the upper induction range stops in a manner that the magnetic field is applied while the upper heating unit 22 of the upper induction coil emanating the magnetic field and the lower heating unit 21 of the lower induction coil face each other or the magnetic field from the upper induction range flows into the induction coil of the lower induction range while the lower induction range stops, the phenomenon of damaging the components of the circuit due to the reverse current applied to the electronic circuit of the induction range occurs.

When both the upper induction range and the lower induction range are operating, the magnetic fields from both sides can collide with each other to adversely affect the electronic circuit.

In order to solve this problem, a switch is provided to be able to cut off the reverse current when the reverse current enters the coil of the induction range, and as the switch, an expensive relay contact will be described in the embodiment of the present disclosure.

The upper relay switch 34 and the lower relay switch 35 are connected, and the driving timings of the upper induction range and the lower induction range are checked so that the relay contacts are turned off to prevent the electronic circuit from being damaged due to the reverse current.

In the embodiment of the present disclosure, the relay contact is used, but any configuration of the switch for switching a heating wire may be employed.

Figure 4:
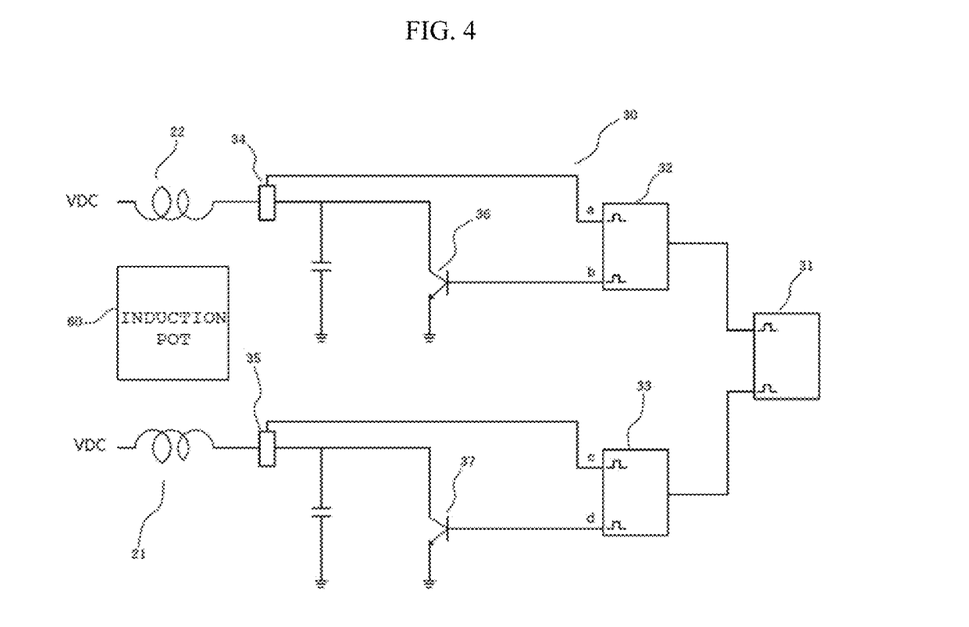
FIG. 4 is a diagram showing an application of an alternating heating type for excluding mutual inductive interference between an upper heating unit and a lower heating unit for heating a cooking object.
Figure 5:
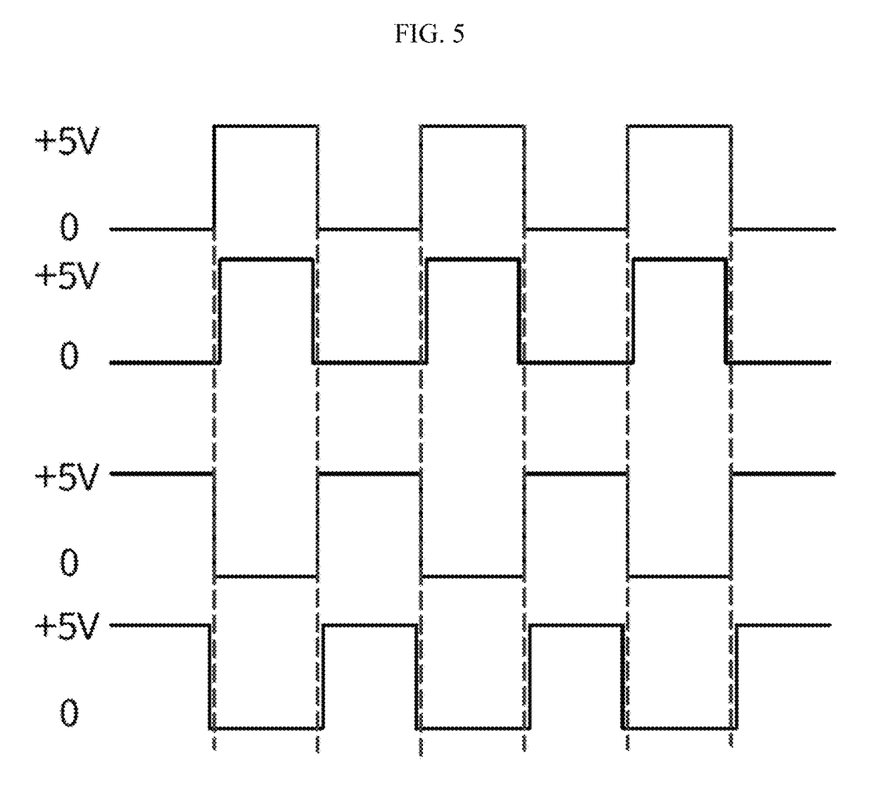
FIG. 5 is a diagram for showing a control signal of FIG. 4.

In FIG. 4, as soon as a lower relay contact signal that is signal c is switched from +5V to 0V, signal a is inputted as +5V from 0V which is an upper relay contact input signal.

That is, as soon as the lower relay switch 35 is turned on and then turned off, the upper relay switch 34 is turned off and then turned on.

That is, regarding the upper relay contact input signal a and the lower relay contact input signal c, as soon as any one of the relay contact input signals a or c is turned on for the upper relay switch 34 and the lower relay switch 35 which are the relay switches, the relay contact input signal a or c is turned off so that the other relay switch is turned off.

By doing so, the reverse current does not affect the control circuit to prevent the damage to the control circuit.

The relay contact input signals a and c cross and switches from +5V to 0V.

Here, signal b and signal d are switched from +5V to 0V at an interval from several microseconds to several tens of milliseconds before the signal a and the signal c are switched from +5V to 0V, respectively (i.e., switched from on to off) at a time difference.

The reverse current due to the magnetic field prevents the controller circuit from being damaged by blocking the upper and lower relays.

IGBT stands for an insulated gate bipolar transistor (IGBT), and is a semiconductor device capable of high-speed switching because it is a self arc-extinguishing type in which a gate-emitter voltage is driven and thus the IGBT is turned on/off by an input signal.

In addition, the IGBT switch is turned off from the turn-on state to prevent the damage to the controller circuit due to the reverse current.

That is, the lower IGBT input signal becomes 0V immediately before the lower relay contact signal becomes 0V.

The lower IGBT input signal is first turned off before the lower relay contact is turned off from the turn-on state.

In addition, after the +5V input signal is applied to the upper relay contact signal, the upper IGBT input signal becomes a +5V input signal at an interval of several microseconds to several tens of milliseconds.

The IGBT switch is turned on at a time difference of several microseconds to several milliseconds after the relay contact is turned on.

The input power is applied to the induction coil only while the IGBT switch is turned on.

Therefore, before the induction coil is turned on, power is applied to the relay signal in advance so that the signal is connected.

Before the relay signal is turned off from the turn-on state, the induction coil is first configured to be turned off from the turn-on state.

After the switching of the relay signal is turned on from the turn-off state, the IGBT switch is turned on from the turn-off state at a time difference of several microseconds to several milliseconds, and the IGBT switch is first turned off from the turn-on state before the switching of the relay signal is turned off from the turned-on state.

In other words, the relay is driven immediately before the power supply is connected to the induction coil, and the wires are connected in advance, and the power supply to the induction coil is turned off and is disconnected, and then the relay is turned off to cut off the power of the reverse current.

The time difference between the upper IGBT input signal b and the upper relay contact input signal a in the upper induction coil and the delay of the lower IGBT input signal d in the lower induction coil prevent the controller from being burned out due to the generation of the magnetic field in the other induction coil due to the cut off of the relay.

The IGBT is the semiconductor device capable of high-speed switching because it is the self arc-extinguishing type in which the turn on/off occurs by the input signal.

The IGBT is the semiconductor device capable of high-speed switching because it is the self arc-extinguishing type in which the gate-emitter voltage is driven and thus the turn on/off occurs by the input signal.

Referring to FIG. 4, the induction range controller 31, which is a main MCU, controls the turn ON/OFF operation of the upper induction range controller 32 and the lower induction range controller 33, and controls the signal input to the IGBT and the signal input to the relay in the upper induction range controller 32 and the lower induction range controller 33, thereby preventing the magnetic fields from the upper and lower induction range from colliding with each other.

Here, the upper heating unit may be configured to perform heating for a longer time by making an output of a magnetic field of the upper heating unit higher than that of the lower heating unit. When a bowl containing food is directly inserted into the heating unit, the food is in close contact with the container at the lower part of the food and thus the food is in close with the heating unit.

However, the upper part is generally formed so the food is spaced apart somewhat from the upper part of the bowl containing food.

Further, a free space is required in order to insert the container to be heated into the induction range of the upper and lower heating type, so the upper part is formed considering that there is bound to be some space between the upper heating unit and the food.

The upper heating unit may be configured to perform heating for a longer time than the lower heating unit, or the upper heating unit and the lower heating unit preferably perform heating in parallel to increase the output of the magnetic field of the upper heating unit and increase the driving time at the same time.

In addition, the pizza has a topping that needs to be melted on an upper part thereof, so the upper part of the pizza may need more heat than a lower part of the pizza.

Here, the upper heating unit and the lower heating unit configures the circuit to connect the upper relay connected to one end of the upper heating unit and the lower relay connected to one end of the lower heating unit so as to be able to cut off the reverse current when the reverse current enters the coils of each of the induction range and to check the driving timing of the upper heating unit in the upper induction range and the driving timing of the lower heating unit in the lower induction range so as to turn off the contact of the lower relay when the contact of the upper relay is turned on and turn off the contact of the upper relay when the contact of the lower relay is turned on, to thereby cut off the reverse current of the other induction range. This configuration is to prevent the reverse current by cutting off the relay at one end of the other heating unit when the upper heating unit and the lower heating unit are applied with the magnetic field signal heated in advance.

Here, after the contacts of the upper relay and the lower relay are each turned on, the switching signal is input so that the upper heating unit and the lower heating unit perform heating at a time difference.

In this way, the magnetic field generated in the upper heating unit and the lower heating unit does not affect the lower heating unit and the upper heating unit, respectively, so as to prevent the damage to the control unit.

Here, before the contacts of the upper relay and the lower relay are each turned off, the switching signal is cut off so that the upper heating unit and the lower heating unit are turned off in advance at a time difference.

The time difference may be several milliseconds or several tens of microseconds.

The unit constituting the switching signal may be IGBT.

Figure 6A:
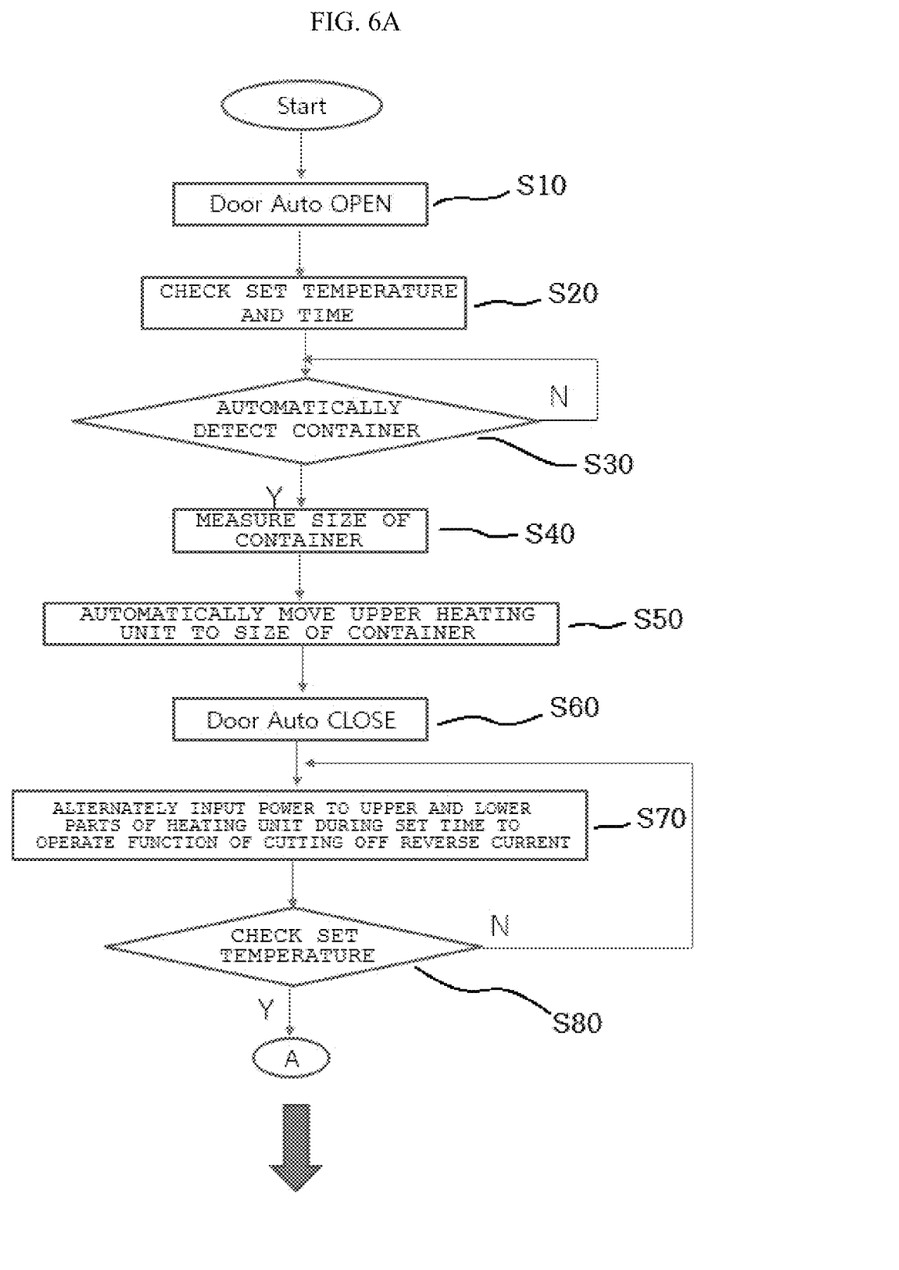
FIGS. 6A and 6B are diagrams related to setting the method for heating an induction range of an upper and lower heating type by a program.
Figure 6B:
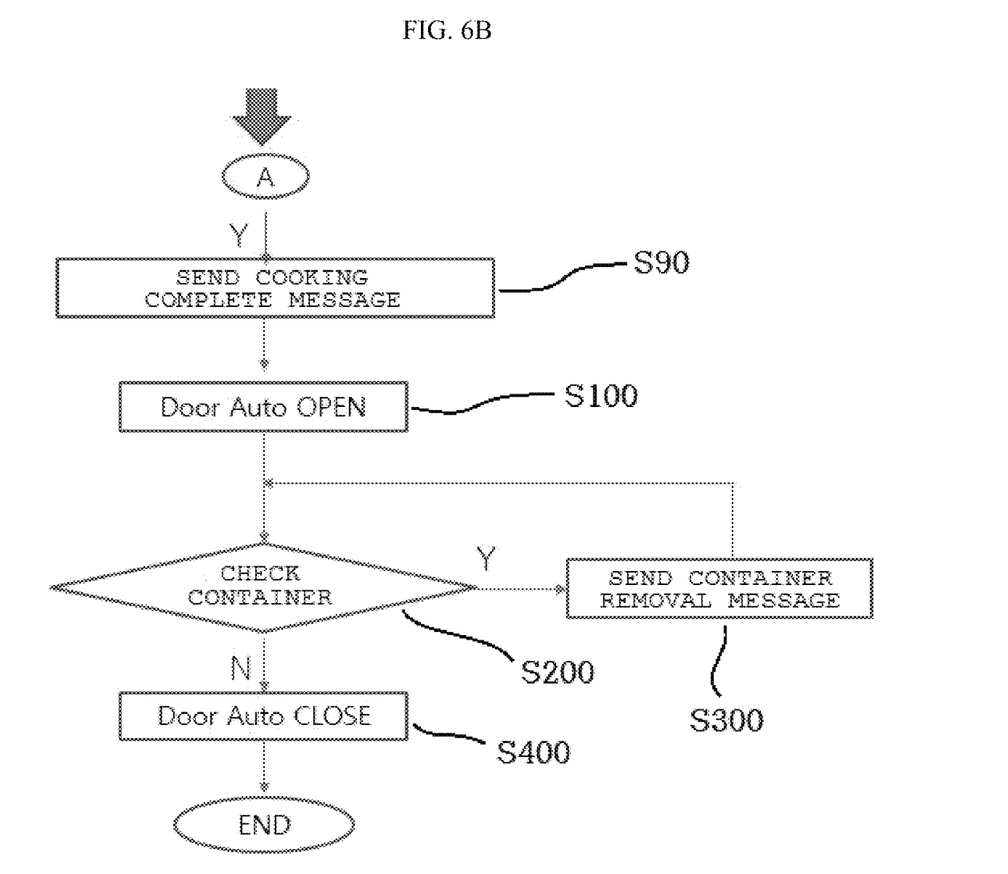

This will be described below with reference to FIGS. 6A and 6B.

The following driving method will be described with reference to FIGS. 1 to 5.

When food or the container containing the food is inserted into the heating unit in which the upper heating unit and the lower heating unit configured as the induction range are integrally configured, if the start button is pressed to open the door of the heating unit (S10) and when there is no door, and therefore the step of opening the door can be omitted.

The set temperature and time are checked (S20).

When the container is automatically detected and the container is inserted, the size of the container is measured (S40), and when the container is not detected, the container is programmed not to perform the subsequent step so that the container is detected again (S30).

The step of measuring the container or the automatically moving the upper heating unit to the size of the cooking utensil may be omitted.

After measuring the size of the container, the step of automatically moving the upper heating unit to the size of the container is performed (S50).

Next, the door of the heating unit is closed (S60), and if there is no step S10, step S60 is also the step that can be omitted.

Programming is made to operate a function of cutting off the reverse current by alternately inputting power to an upper heating unit and a lower heating unit during the set time (S70).

When the set temperature is checked and the set temperature is reached (S80), the process proceeds to the subsequent step, but when the set temperature is not reached, the programming is made to repeat the step S70.

A cooking complete message is sent when the set temperature is reached (S90).

Next, when the door is opened (S100), the container is checked (S200), and the container is inserted, a container removal message is sent while the container is opened (S300), and the step of closing the door when the container is removed is performed (S400).

The present disclosure relates to a method of driving an induction range of an upper and lower heating type.

In this way, one cycle of cooking food is finished.

The step of automatically detecting the container to be heated in the induction range to measure the size of the container when the container is inserted may be selected in some cases.

The step of not proceeding to a subsequent step to detect the container again when the container is not detected may also be selected in some cases.

The step of measuring the size of the container (S40) after step S30 may be selected in some cases.

In addition, the step of automatically moving the upper heating unit to the size of the container (S50) after the step S40 may be selected in some cases.

The method may further include the step of opening the door of the induction range (S100), the step of checking the container (S200), the step of sending a container removal message (S300) when the container is inserted, and the step of closing the door (S400) when the container is removed, which may be selected in some cases.

The contents disclosed above are merely exemplary, and various modifications may be made by those skilled in the art without departing from the scope of the claims claimed in the claims, and therefore the protection scope of the disclosed contents is not limited to the specific embodiments described above.

What is claimed is:

1. An induction range of an upper and lower heating type, comprising:
    a body portion provided with an internal space having a cooking object housed therein;
    a lower heating unit provided on-an a bottom surface inside the body portion to heat and cook a lower part of the cooking object;
    an upper heating unit provided on a top surface inside the body portion to heat and cook an upper part of the cooking object; and
    a control unit setting and controlling a temperature and time of the heating unit,
    wherein the upper heating unit and the lower heating unit stop after the lower heating unit heats the lower surface of the cooking object for a predetermined time in the entire heating time of the cooking object by the control unit,
    the lower heating unit and the upper heating unit alternately heat the upper and lower parts of the cooking object for a predetermined time by the method for allowing the upper heating unit to heat the top surface of the cooking object for a predetermined time and then stop, the upper heating unit and the lower heating unit comprise respectively an upper switch connected to an end of the upper heating unit and a lower switch connected to an end of the lower heating unit so that a reverse current can be cut off when the reverse current is input to the coils of each of the induction range,
    the upper switch and the lower switch are configured as an upper relay and a lower relay, respectively, to make each of their contacts turned on or off,
    each of back ends of the upper relay and the lower relay comprises a switching unit comprising a switching signal,
    the switching signal is input so that the upper heating unit and the lower heating unit perform heating at a time difference, after the contacts of the upper relay and the lower relay are each turned on,
    a circuit is configured to check a driving timing of the upper heating unit in an upper induction range and a driving timing of the lower heating unit in a lower induction range to turn off a contact of the lower switch when a contact of the upper switch is turned on and turn off the contact of the upper switch when the contact of the lower switch is turned on, to thereby cut off the reverse current of the other induction range,
    the switching signal is input so that the contacts of the upper switch and the lower switch are each turned on and then the upper heating unit and the lower heating unit perform heating at a time difference, and
    the switching signal is cut off so that the upper heating unit and the lower heating unit are turned off in advance at a time difference before the contacts of the upper switch and the lower switch are each turned off, so that a damage of a controller due to a magnetic field can be prevented.

2. The induction range of an upper and lower heating type of claim 1, wherein the body portion is provided with a blower fan for cooling a handle portion of a container in which the heated cooking object is contained.

3. The induction range of an upper and lower heating type of claim 1, wherein the body portion is provided with a tray for inserting or removing the cooking object between the upper heating unit and the lower heating unit.

4. The induction range of an upper and lower heating type of claim 1, wherein an output of a magnetic field of the upper heating unit is higher than that of the lower heating unit.

5. The induction range of an upper and lower heating type of claim 1, wherein the upper heating unit is configured to perform heating for a longer time by making a heating time of the upper heating unit longer than that of the lower heating unit.

6. The induction range of an upper and lower heating type of claim 1, wherein the time difference is several milliseconds or several tens of microseconds.

7. The induction range of an upper and lower heating type of claim 1, wherein a unit constituting the switching signal is IGBT.

\* \* \* \* \*